_United States Patent Office_ 3,122,692
Patented Feb. 25, 1964

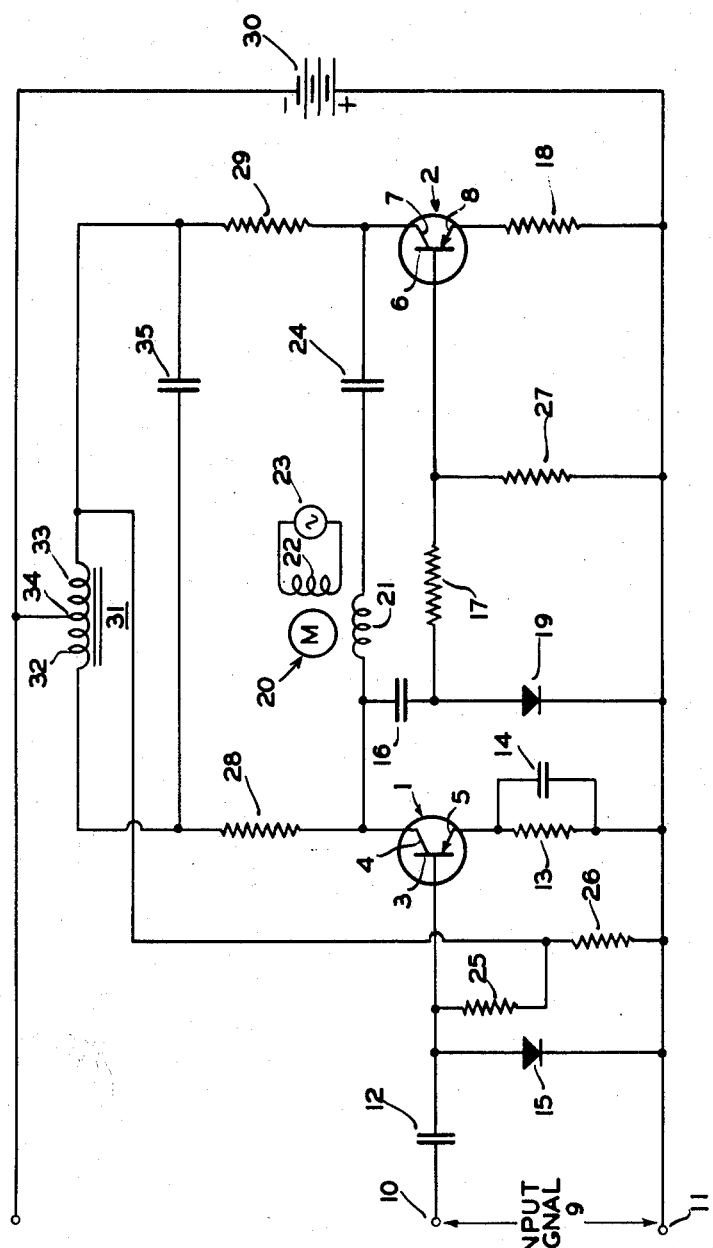

3,122,692
MOTOR CONTROL CIRCUIT
Harry B. Wattson, Rutherford, and Benjamin Fennick, River Edge, N.J., assignors to The Bendix Corporation, a corporation of Delaware
Filed Apr. 14, 1960, Ser. No. 22,175
16 Claims. (Cl. 318—207)

The present invention relates to electronic control circuits and more particularly to an electronic motor control circuit for a two-phase motor.

Aircraft equipment requires reliability with a minimum of space and weight. The desirability of use of the present invention aboard aircraft over apparatus heretofore used for control of two-phase motors is especially apparent in view of the requirements of reliability, space, and weight. Reliability is increased through reduction in the number of components required to perform a particular function. Utilization of the standard 28 volt D.-C. supply already in existence on most aircraft, for example, eliminates the need for a separate power supply, thereby eliminating one possible source of circuit failure. Savings in space and weight are also achieved through reduction in the number of components. Substitution of a mere connection to the aircraft D.-C. supply for a self-contained power supply provides an obvious saving in space and weight. Similarly, elimination of transformers in the circuit, and use of transistors for amplification of A.-C. signals also provides increased circuit reliability, while at the same time reducing the space and weight requirements of the circuit.

Accordingly, it is a primary object of the invention to provide a new and novel lightweight, compact, and reliable motor control circuit adapted to control the operation of a two-phase motor in a more efficient manner than heretofore employed.

Another object of the invention is to provide a new, novel, and simplified motor control circuit utilizing interchangeable active circuit elements as amplifiers.

Another object of the invention is to provide an amplifier circuit which operates from a lower voltage supply than heretofore and at the same time provides maximum output voltage.

A further object of the invention is to provide a new and novel motor control circuit utilizing a pair of amplification stages so connected that the magnitude of the voltage across the control phase of the motor is substantially twice the output voltage of either amplification stage.

Another object of the invention is to provide a two-stage amplification system from which is obtained the power gain of two stages in cascade at low control signal levels, the peak-to-peak voltage swing of a bridge circuit at large control signal levels, and high speed response at all control signal levels.

Still another object of the invention is to provide a novel two-stage amplification system in which excessive cut-off of the amplifiers is prevented, even when saturation level signals are present.

Still another object of the invention is to provide the effect of a D.-C. supply voltage of a magnitude greater than the voltage magnitude of the actual D.-C. supply.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

Referring to the drawing, the numeral 1 represents a first amplifier which exhibits a signal phase reversal between its input 3 and output 4. More particularly, this first amplifier 1 may be a transistor of either conductivity type, and is shown in the drawing as a "PNP" transistor. The numeral 2 represents a second amplifier, which is identical with amplifier 1, and also exhibits a signal phase reversal between its input 6 and output 7. Thus, in the drawing, the second amplifier 2 is also depicted as a "PNP" transistor. The transistors are identical and therefore also interchangeable. Both transistors are connected in a grounded emitter configuration. Because the output of the first amplifier 1 is used to drive the second amplifier 2, it is apparent that amplifiers 1 and 2 are connected in cascade.

A.-C. input signals from a signal source 9 are applied across terminals 10 and 11. The input signals are impressed through a coupling means shown as a capacitor 12 across the base 3 and emitter 5 of the first transistor 1 through an emitter bias resistor 13 in parallel with a by-pass capacitor 14. To prevent the coupling capacitor 12 from developing a reverse bias on the base 3 of transistor 1, reducing the amplifier gain and slowing down the system, a first half-wave rectifying means 15, shown in the drawing as a diode, is used as a clamp, keeping the base 3 of the "PNP" transistor 1 from going positive with respect to the emitter 5.

A portion of the output signal from the first transistor 1, which is 180° out of phase with the input signal to the first transistor 1 because of the phase inversion characteristic of the grounded emitter configuration, forms the input signal to the second transistor 2. This signal is coupled from the collector 4 of the first transistor 1 through a coupling means shown as a capacitor 16 in series with a resistor 17 to the base 6 of the second transistor 2, and from the emitter 5 of the first transistor 1 through the series combination of the emitter bias resistor 13 in parallel with the by-pass capacitor 14 and the emitter bias resistor 18. It will now appear obvious to persons skilled in the art, that the two transistors are connected in cascade. To prevent the coupling capacitor 16 from developing a reverse bias on the base 6 of transistor 2, a second half-wave rectifying means 19, shown in the drawing as a diode, is used as a clamp, which prevents the base 6 of the "PNP" transistor 2 from going positive with respect to emitter 8.

The output signal from the second transistor 2 is 180° out of phase with the input signal to the second transistor 2 because of the phase inversion characteristic of the grounded emitter configuration, and therefore is 180° out of phase with the output of the first transistor 1.

The numeral 20 represents a two-phase A.-C. motor having a control winding 21 and a power winding 22. The power winding 22 is connected to a source of A.-C. power 23. The control winding 21 is connected between the collectors 4 and 7 of transistors 1 and 2 respectively, by means of a capacitor 24 selected with respect to the control winding 21 so as to form a series resonant circuit therewith at the frequency of the input signal, and to provide the 90° phase difference between the voltage on the two windings 21 and 22, necessary for two-phase motor operation. Thus, the control winding 21 operates from a voltage corresponding to the sum of the absolute values of the voltage on collectors 4 and 7 of transistors 1 and 2 respectively, minus the voltage drop across the capacitor 24 which can be made negligible by using a large value of capacitance. By use of the proper values of components, the absolute amplitude of the signal on the collector 7 of the second transistor 2 can be made equal to the absolute amplitude of the signal on the collector 4 of the first transistor 1. Since the signals are 180° out of phase, the voltage applied across the control winding 21 is twice the amplitude of the voltage on either collector 4 or 7. It is to be noted that this circuit can be used to drive any load, the two-phase A.-C. motor 20 being merely one specific type of load.

Bias voltages are supplied from a source of D.-C. voltage 30, which may have a magnitude of 28 volts. In order to produce the effect of having a D.-C. supply voltage of greater magnitude than actually exists, the D.-C. supply voltage 30 is connected to collectors 4 and 7 through circuit means such as resistance means in series with inductance means, shown in the drawing as a center-tapped choke 31 having halves 32 and 33 connected to resistors 28 and 29 respectively. Thus, the D.-C. voltage is connected through the center-tap 34 of choke 31 to collector 4 through one half of the choke 32 in series with resistor 28, and to collector 7 through the other half of the choke 33 in series with resistor 29. Capacitor 35 is connected in parallel with the center-tapped choke 31 in order to make the transistor load less inductive.

Resistors 25 and 26 are base bias resistors for the first transistor 1, while resistor 27 is the base bias resistor for transistor 2. Collector bias is supplied to transistor 1 through resistor 28, and to transistor 2 through resistor 29. The functioning of bias resistors is well known in the art, and will not be herein discussed.

Operation of the circuit is as follows:

Assume an A.-C. input signal from signal source 9 is applied across terminals 10 and 11. This signal is of the same frequency as that of the source of A.-C. power 23, but is variable in amplitude and reversible in phase such as may be obtained from a synchro. Assume first that the absolute value of the maximum instantaneous amplitude of the input signal is less than the absolute value of the negative bias on the base 3 of transistor 1. In such case, there is never a forward voltage across diode 15. Thus diode 15 does not conduct, and no clamping action is produced by diode 15 in this instance.

The amplitude of the A.-C. signal appearing on the collector 4 of transistor 1 is increased by the gain of this transistor, and the phase of the A.-C. signal is reversed. Part of this signal is coupled to the base 6 of transistor 2. Assume also that the amplitude of this signal is relatively small, so that diode 19 does not conduct, for reasons previously explained relative to diode 15. Hence, there is no clamping action by diode 19 in this instance.

The amplitude of the A.-C. signal appearing on collector 7 of transistor 2 is increased by the gain of this transistor, and the phase of the A.-C. signal is reversed. Thus, transistor 1 drives transistor 2, resulting in the power gain of two transistors in cascade. The output of the circuit is taken across collectors 4 and 7 of transistors 1 and 2 respectively, and is fed to the control winding 21 of motor 20 through capacitor 24 which shifts the phase of the voltage on control winding 21 by 90° with respect to the voltage on power winding 22, in order to render motor 20 operative. The power winding 22 of motor 20 is continuously energized by current from the A.-C. source 23.

Hence, the greater the amplitude of the input signal, the greater the amplitude of the output voltage across collectors 4 and 7, and the greater the speed of motor 20. A phase reversal of the input signal 9 will reverse the phase of the output voltage across collectors 4 and 7 because of the phase reversal of the input signals to transistors 1 and 2, reversing the phase of the voltage on control winding 21, thereby reversing the direction of rotation of motor 20 in the manner well known in the art.

Assume now that the amplitude of the input signal is relatively large. If the absolute value of the maximum instantaneous amplitude of the input signal exceeds the absolute value of the negative bias on the base 3 of transistor 1, a reverse voltage will begin to build up on capacitor 12 because of the input signal flowing through the unilateral base-to-emitter resistance of transistor 1, in series with capacitor 12. However, diode 15 will conduct when capacitor 12 begins to acquire a reverse bias, preventing this reverse bias from building up. This preserves maximum amplifier gain and speed of response, preventing excessive cut-off of transistor 1 even when the amplitude of the input signal reaches the saturation level of transistor 1. Furthermore, when the amplitude of the input signal reaches a positive value, the absolute value of which exceeds the absolute value of the negative bias on the base 3 of transistor 1, diode 15 will conduct, protecting transistor 1 from instantaneous positive base voltages, thereby preventing excessive cut-off of transistor 1.

Diode 19 performs the same function as diode 15, when the amplitude of the output voltage of transistor 1 is large enough to drive transistor 2 beyond cut-off if applied to the base 6 without clamping means 19.

It is to be noted that the control winding 21 of motor 20 is fed by a bridge circuit formed by transistors 1 and 2 and resistors 28 and 29. At input signals of transistor saturation levels, the aforementioned bridge circuit permits the control winding 21 to be driven through a theoretical limit of twice the collector supply voltage. With conventional circuitry, in such a bridge arrangement the two transistors 1 and 2 would be driven by voltages equal in amplitude and opposite in phase. These signals would be developed either from a transformer or a preceding phase inverter stage. In either case, an additional stage would be necessary in order to obtain adequate gain. The cascade connection of the two transistors 1 and 2 in the bridge utilizes the phase inversion of the signal by the first transistor 1 for obtaining a signal of proper phase for the second transistor 2. In this manner, the cascade bridge circuit provides the power gain of two stages in cascade at low signal levels, the peak-to-peak voltage swing of a bridge circuit for large signal levels, and omits the use of a transformer or additional stage for phase inversion.

It is apparent that when no input signals appear across terminals 10 and 11, transistors 1 and 2 are at their quiescent operating points, which are identical in this circuit. Hence, the collector bias on collector 4 of transistor 1 is equal to the collector bias on collector 7 of transistor 2 so that no voltage exists across collectors 4 and 7. In such instance, motor 20 will not be driven because control winding 21 is not energized. Referring to the bridge circuit which was mentioned previously, when there are no input signals to the circuit, there is no voltage across control winding 21 and the bridge is balanced.

The function of center-tapped choke 31 will be apparent from the following description of its operation.

Assume that a large input signal is suddenly applied across terminals 10 and 11 in a positive-going direction. Assume that this signal is of sufficient amplitude to drive transistor 1 to cut-off. This essentially stops the flow of the emitter-collector current in transistor 1, which previously had flowed through resistor 28 and through half 32 of choke 31. Thus, as a result of there being approximately no voltage drop across resistor 28, the amplitude of the negative voltage on collector 4 of transistor 1 tends to become approximately the same as the amplitude of the voltage of the D.-C. supply 30. However, by application of Lenz's Law, it is apparent that a magnetic flux is set up in the half 32 of center-tapped choke 31 wherein the emitter-collector current of transistor 1 ceased flowing, which in turn sets up a voltage in the half 32 of choke 31 that would have a tendency to oppose the decrease in emitter-collector current. Therefore, the polarity of the voltage induced in half 32 of choke 31 is such as to drive collector 4 of transistor 1 still further negative than would be permitted by the amplitude of the D.-C. supply voltage alone.

Consider also the effect of the change in emitter-collector current of transistor 2 due to the effect of applying a large input signal across terminals 10 and 11, in a positive-going direction. It has already been shown that the voltage on collector 4 of transistor 1 will go highly negative. Some of this large negative voltage is applied to the base 6 of transistor 2, driving transistor 2 to saturation. This greatly increases the flow of emitter-collector current of transistor 2, which flows through half 33 of center-tapped choke 31. A large voltage drop appears across resistor 29, tending to make the voltage on collector 7 of transistor 2 less negative. At the same time, by application of Lenz's Law, it is apparent that a magnetic flux is set up in the half 33 of center-tapped choke 31 wherein the emitter-collector current of transistor 2 increases, which in turn sets up a voltage in the half 33 of choke 31 that would have a tendency to oppose the increase in emitter-collector current. Therefore, the polarity of the voltage induced in half 33 of choke 31 is such as to drive collector 7 of transistor 2 still less negative, and hence collector 4 of transistor 1 still further negative than would be permitted by the amplitude of the D.-C. supply voltage alone.

In similar fashion, if a large input signal is suddenly applied across terminals 10 and 11 in a negative-going direction of sufficient amplitude to drive transistor 2 to cut-off, center-tapped choke 31 will tend to drive collector 7 of transistor 2 still further negative, and collector 4 of transistor 1 still less negative than would be permitted by the amplitude of the D.-C. supply voltage alone.

From the foregoing explanation of the function of center-tapped choke 31, it is clear that the collectors 4 and 7 of transistors 1 and 2 can swing through a greater voltage range than they could if there were no choke used in the circuit and only the D.-C. voltage source 30 could apply voltage to collectors 4 and 7. This provides the advantage of operating the control winding 21 from a lower voltage D.-C. supply 30 than would otherwise be possible if conventional circuitry were used.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. In an apparatus for controlling a servomotor having a power winding and a control winding, the combination comprising a first transistor having an emitter, a collector, and a base, a first input circuit connected between the emitter and base of said first transistor, circuit means connecting said first input circuit to a source of A.-C. control signal, a second transistor having an emitter, a collector, and base, a second input circuit connected between the emitter and base of said second transistor, circuit means connecting said second input circuit to the collector of said first transistor; a source of D.-C. potential, a choke having a center-tap connected to said source of D.-C. potential, circuit means connecting said choke to the collectors of said transistors to apply a D.-C. potential across the emitter and collector of each of said transistors from said D.-C. source through said choke and said circuit means, said choke supplying collector voltage swings beyond the magnitude of the collector supply voltage; means connecting the power winding of said servomotor to a source of alternating current, and circuit means connecting the control winding of said servomotor between the collectors of said first and second transistors for providing control of said servomotor by the voltage difference between said collectors.

2. Apparatus as specified in claim 1 wherein said first input circuit includes a half-wave rectifying device operating as a clamp, and said second input circuit includes a half-wave rectifying device operating as a clamp.

3. Apparatus as specified in claim 1 wherein said first transistor and said second transistor are connected in a common emitter configuration.

4. In an apparatus for controlling a servomotor having a power winding and a control winding, the combination comprising a first transistor having an emitter, a collector, and a base, a first input circuit connected between the emitter and base of said first transistor, circuit means connecting said first input circuit to a source of an A.-C. control signal; a second transistor having an emitter, a collector, and a base, a second input circuit connected between the emitter and base of said second transistor, circuit means connecting said second input circuit to the collector of said first transistor; a source of D.-C. potential, inductive circuit means for supplying a D.-C. potential across the collectors and emitters of said transistors from said D.-C. source, said inductive circuit means supplying collector voltage swings beyond the magnitude of the collector supply voltage by inductively coupling the collector circuit of said first transistor to the collector circuit of said second transistor; means adapted to connect the power winding of said servomotor to a source of alternating current; circuit means connecting the control winding of said servomotor between the collectors of said first and second transistors for providing control of said servomotor by the voltage difference between said collectors.

5. In an apparatus for controlling a servomotor having a power winding and a control winding, the combination comprising a first transistor having an emitter, a collector, and a base, a first input circuit connected between the emitter and base of said first transistor, circuit means adapted to connect said first input circuit to a source of an A.-C. control signal; a second transistor having an emitter, a collector, and a base, a second input circuit connected between the emitter and base of said second transistor, circuit means connecting said second input circuit to the collector of said first transistor; a source of D.-C. potential connected across the collectors and emitters of said transistors; means connecting the power winding of said servomotor to a source of alternating current, and circuit means connecting the control winding of said servomotor between the collectors of said first and second transistors for providing control of said servomotor by the voltage difference between said collectors.

6. In an apparatus for controlling a servomotor having a power winding and a control winding, the combination comprising two transistor amplifiers connected in cascade, each of said transistor amplifiers having input means including a half-wave rectifying device operating as a clamp, means for coupling a source of A.-C. control signal to the input of the first transistor amplifier; means connecting the power winding of said servomotor to a source of alternating current, and means coupling the control winding of said servomotor between the outputs of said transistor amplifiers.

7. In an apparatus for controlling a servomotor having a power winding and a control winding, the combination comprising two transistor amplifiers connected in cascade, means for coupling a source of A.-C. control signal to the input of the first transistor amplifier; means connecting the power winding of said servomotor to a source of alternating current, and means coupling the control winding of said servomotor between the outputs of said transistor amplifiers.

8. In an apparatus for controlling a servomotor having a power winding and a control winding, the combination comprising a first transistor having an emitter, a collector, and a base, and providing a signal phase difference of substantially 180° between the collector and base, a first input circuit connected between the emitter and base of said first transistor, circuit means connecting said first input circuit to a source of A.-C. control signal; a second transistor having an emitter, a collector, and a base and providing a signal phase difference of substantially 180° between the collector and base, a second input circuit connected between the emitter and base of said second transistor, circuit means connecting said second input circuit to the collector of said first transistor; means connecting the power winding of said servomotor to a source of alternating current; and circuit means connecting the control winding of said servomotor between the collectors of said first and second transistors.

9. In an apparatus for controlling a servomotor having a control winding, the combination comprising a bridge circuit having a first arm including a first amplifier having an input and an output, a second arm including a second amplifier having an input and an output, and third and fourth arms each including a load resistor, the outputs of said amplifiers being directly connected to the associated load resistors, circuit means connecting a source of D.-C. potential across each of the amplifiers and the associated load resistor, circuit means connecting the control winding of said servomotor across the bridge between the outputs of said first amplifier and said second amplifier, circuit means connecting the input of said first amplifier to a source of an A.-C. control signal, and circuit means connecting the output of said first amplifier to the input of said second amplifier.

10. Apparatus as described in claim 9 in which the third and fourth arms each include one half of a center-tapped choke in series with the load resistor and the circuit means connecting the D.-C. source to the bridge is connected to the centertap of the choke.

11. In an apparatus for controlling a servomotor having a power winding and a control winding, the combination comprising a first transistor amplifier having an input and an output, a second transistor amplifier having an input and an output, means for coupling a source of an A.-C. control signal to the input of said first amplifier, coupling means connecting the output of said first amplifier to the input of said second amplifier; means connecting the power winding of said servomotor to a source of alternating current; and means coupling the control winding of said servomotor between the outputs of said amplifiers.

12. In an apparatus for controlling a servomotor having a power winding and a control winding, the combination comprising a first amplifier having input means and output means, a second amplifier having input means and output means, means for coupling the output of said first amplifier to the input of said second amplifier, means for connecting the power winding of said servomotor to a source of alternating current, and means for coupling the control winding of said servomotor between the outputs of said first and second amplifiers.

13. A transistor amplifier circuit comprising in combination a first transistor having an emitter, a collector, and a base, a first input circuit connected between the emitter and base of said first transistor, circuit means connecting said first input circuit to a source of an A.-C. control signal; a second transistor having an emitter, a collector, and a base, a second input circuit connected between the emitter and base of said second transistor, circuit means connecting said second input circuit to the collector of said first transistor; a source of D.-C. potential, inductive circuit means connecting the D.-C. source to the collectors and emitters of said transistors, said inductive circuit means supplying collector voltage swings beyond the amplitude of the collector supply voltage by inductively coupling the collector circuit of said first transistor to the collector circuit of said second transistor; and a load connected between the collectors of said transistors.

14. Apparatus as specified in claim 13 wherein said first input circuit includes a half-wave rectifying device operating as a clamp, and said second input circuit includes a half-wave rectifying device operating as a clamp.

15. A transistor amplifier circuit, comprising in combination, a first transistor having an emitter, a collector, and a base, a first input circuit connected between the emitter and base of said first transistor, circuit means connecting said first input circuit to a source of A.-C. control signal; a second transistor having an emitter, a collector, and a base, a second input circuit connected between the emitter and base of said second transistor, circuit means connecting said second input circuit to the collector of said first transistor; a source of D.-C. potential, circuit means connecting the D.-C. source to the collectors and emitters of said transistors, and a load connected between the collectors of said transistors.

16. Apparatus as specified in claim 15 wherein each of said first and second input circuits include a half-wave rectifying device operating as a clamp.

References Cited in the file of this patent

UNITED STATES PATENTS

| 2,864,985 | Beck | Dec. 16, 1958 |
| 2,887,642 | Ehret et al. | May 19, 1959 |
| 2,937,711 | Machlis | May 24, 1960 |

FOREIGN PATENTS

| 569,070 | Canada | Jan. 13, 1959 |